United States Patent [19]

Carlson

[11] Patent Number: 5,469,997
[45] Date of Patent: Nov. 28, 1995

[54] MULTI-BICYCLE REAR MOUNTING BICYCLE RACK

[76] Inventor: David C. Carlson, 5 La Villita Cr. NE., Albuquerque, N.M. 87112

[21] Appl. No.: 305,077

[22] Filed: Sep. 13, 1994

[51] Int. Cl.⁶ .............................. B60R 9/00; B60R 11/00
[52] U.S. Cl. ...................... 224/521; 224/506; 224/507; 224/532; 224/535; 224/537; 224/924
[58] Field of Search .................. 224/42.03 R, 42.07, 224/42.03 B, 309, 314, 315, 322, 323, 324, 325, 329, 42.45 R

[56] References Cited

U.S. PATENT DOCUMENTS

| | | | |
|---|---|---|---|
| 4,676,414 | 6/1987 | DeGuevara | 224/42.03 R |
| 5,004,133 | 4/1991 | Wyers | 224/42.03 B |
| 5,303,857 | 4/1994 | Hewson | 224/42.03 B |

*Primary Examiner*—Henry J. Recla
*Assistant Examiner*—Timothy L. Maust

[57] ABSTRACT

The rear mounted multi-bicycle steel rack securely locks up to six bicycles for stable, safe and secure transport. The rack mounts into the rear receiver hitch with a simple pin. Up to six bicycles with different tubular frame sizes can be placed on the rack with a securing arm and lock providing stability and security. The hinges provide ease in movement of the arm. The high gloss finish in a variety of colors protects the rack from the weather and road damage. The clear advantages of bicycle rack is the lightweight design, lateral stability, locking feature, adjustment for different bicycle tubular frame sizes and ease of operation.

6 Claims, 3 Drawing Sheets

MULTI-BICYCLE REAR MOUNTING BICYCLE RACK

BACKGROUND

1. Field of Invention

This invention is a bicycle carrier, specifically a carrier that mounts on the rear of vehicles.

2. Background of Prior Art

Racks and carriers mounted to the exterior of vehicles have long been used for the transport of bicycles. These racks were mounted to either the roof, the bumper or the rear trunk lid. Most of these relied were designed to be fabricated out of tubular metal and attached with either a series of straps or with a hitch ball mounting bolt. These racks were generally complicated, non-lockable, unstable and were limited in capacity, in most cases to two to three bicycles.

It is known that there presently is a bicycle rack that mounts to the hitch ball mount on a bumper and carries up to four bicycles using a bent metal tube as the carrying arm that contains a series of bicycle brackets. The bicycles are held in place by rubber straps. This design is inherently weak because of the lateral forces that are placed on these straps when the vehicle travels especially in off-road situations. In order to secure the bicycles from lateral movement a number of rubber brackets are available. In order to provide lateral stability an alternate design exists, a plate that holds down the top tubes of the bicycles into the brackets. In order to account for a variation in the top tube thickness two large screws are used.

Due to the inherent limitations of the bumpers designed in newer vehicles, the capacity of bumper mounted racks is limited. It is known that there is a bicycle rack that does insert into a trailer hitch receiver. This rack, however, relies on a carrier arm design that is not lockable. Because there is such a variety in tubing thickness in newly designed bicycles the current manufactures have not approached the design of bicycle racks by designing a standard lockable framework. This has limited the possible design solutions.

The following pre-existing patents were researched:

| | | | | |
|---|---|---|---|---|
| 4,089,448 | 5/1978 | Traeger | 224/42.03 B | Bicycle/Ski Rack, bumper mounted |
| 4,290,540 | 9/1981 | Allen | 224/321 X | Foldable Bicycle Carrier, trunk mounted |
| 4,332,337 | 6/1982 | Kosecoff | 224/321 X | Foldable Bicycle Carrier, trunk mounted |
| 4,394,948 | 7/1983 | Graber | 224/42.03 R | Bicycle Carrier, trunk mounted |
| 4,452,385 | 6/1984 | Prosen | 224/42.03 B | Bicycle Carrier, trunk mounted |
| 4,676,414 | 6/1987 | Deguevara | 224/42.03 B | Article Carrier, hitch mounted |
| 4,856,686 | 8/1989 | Workentine | 224/42.03 B | Cargo Carrier, hitch mounted |
| 4,971,237 | 11/1990 | Davis | 224/42.07 | Tire Holder, frame mounted |
| 4,997,116 | 3/1991 | Grim | 224/329 X | Rear Mounting Carrier, trunk mounted |
| 5,096,102 | 3/1992 | Tolson | 224/917 | Article Carrier, hitch mounted |
| 5,305,936 | 4/1994 | Nusbaum | 224/42.03 B | Bicycle/Ski Carrier, trunk mounted |

Most of the existing patents address trunk mounted devices that secure themselves with a series of straps. Those devices that are hitch mounted have structural limitations.

Although their have been numerous attempts to solve the problems associated with providing a strong, high capacity, lockable rack the heretofore known designs suffer from one or more of the following disadvantages:

a. They have limited capacity based on their mounting point.

b. They have limited capacity due to their lack of flexibility in handling a variety of tubing thicknesses.

c. They rely on rubber mounting straps to secure them which allows lateral movement.

d. They are non-lockable.

OBJECTS AND ADVANTAGES

The objects and advantages of the present invention include:

a. A structural design that relies on the capacity of several elements acting together which create a strength that exceeds the sum of their parts.

b. A simple design that relies on an attachment point that has the capacity to do the job and not damage the vehicle.

c. Adjustable carrier brackets that will hold a variety of tubing sizes securely.

d. A structure that is lockable.

e. Capacity up to six bicycles.

f. Ease in placement of rack in hitch and ease in placement of bicycles on rack.

SUMMARY OF THE INVENTION

The present invention addresses the need for a stable, rear mounted, multi-bicycle, locking rack. The rack can accommodate up to six bicycles with rubber adjustment pads which accommodate different tube frame sizes. The rack easily locks to provide security. In addition, the rack arm is placed into the receiver hitch of a vehicle. The total weight of approximately twenty pounds allows for easy placement of the rack into the receiver hitch. The lateral stability of the rack in rugged conditions allows for secure transport of the bicycles without vehicle damage.

LIST OF REFERENCE NUMERALS

Figure 1:
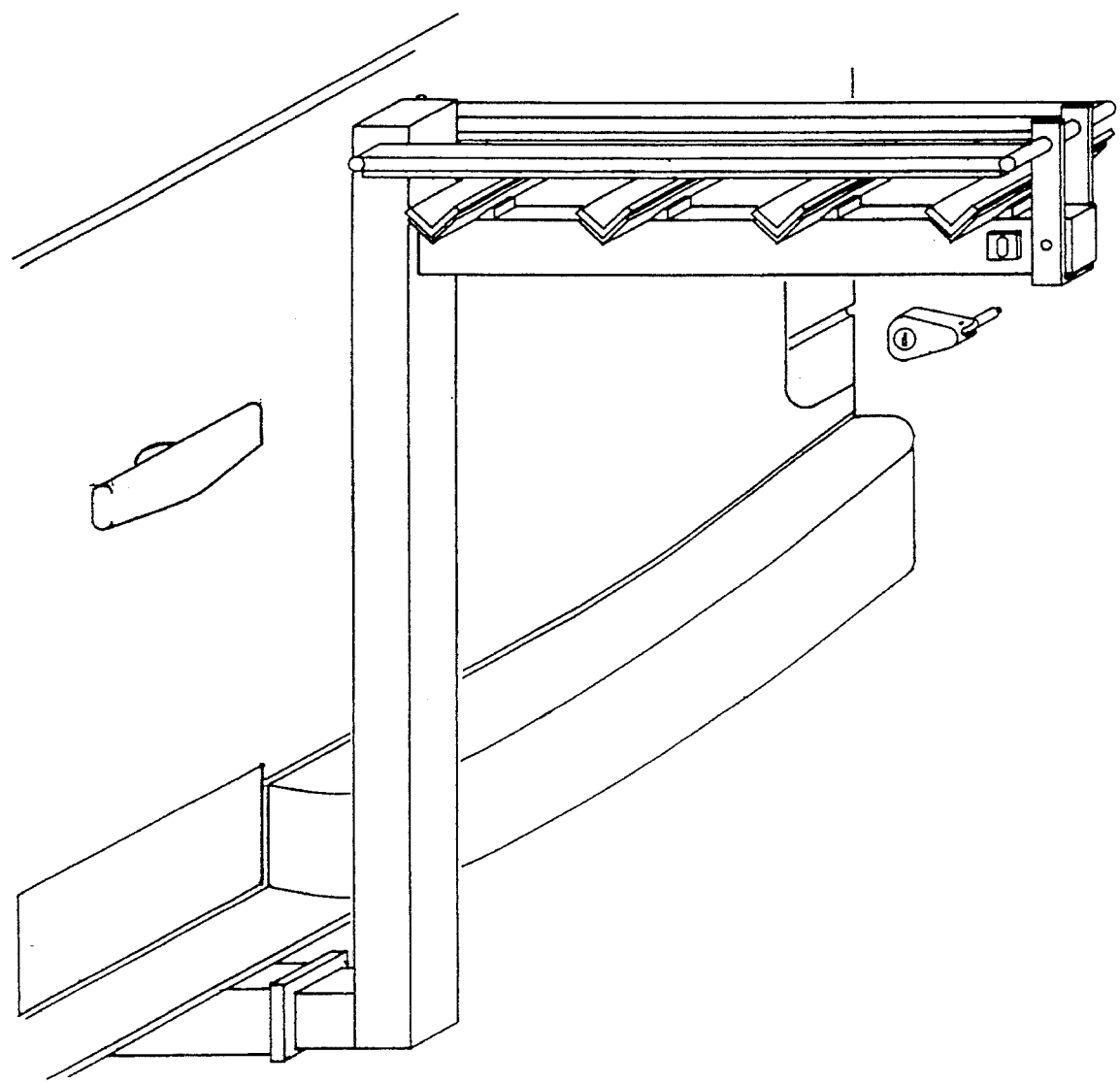
FIG. 1 shows the rack mounted to the receiver hitch of a vehicle.

1 Vertical member
2 Locking arm
3 Hole for locking hitch pin
4 Locking screw device
5 Bicycle holding brackets
6 Locking hitch pin
7 Locking bracket
8 Receiving arm
9 Hinge

10 Hinge
11 Screw Shaft hole
12 Lock receiving hole
13 Locking arm stop
14 Bicycle holding bracket shims

DESCRIPTION OF INVENTION

As indicated in FIG. 1, the bicycle rack is placed in the receiver hitch attached to the rear bumper of a vehicle and provides a very stable and secure base for the rack.

Figure 2:
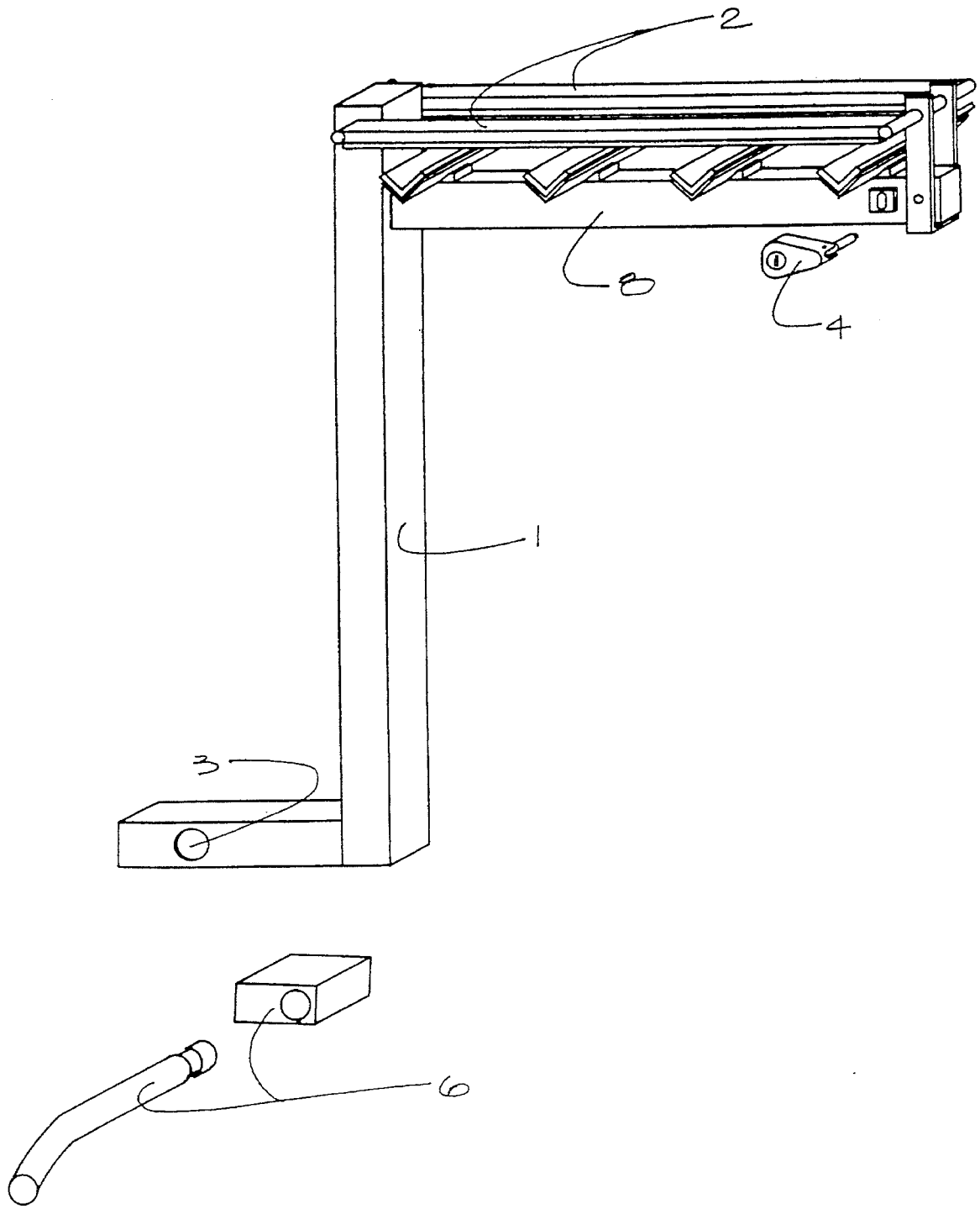
FIG. 2 shows the detail of the rack unattached to a vehicle.
Figure 3:
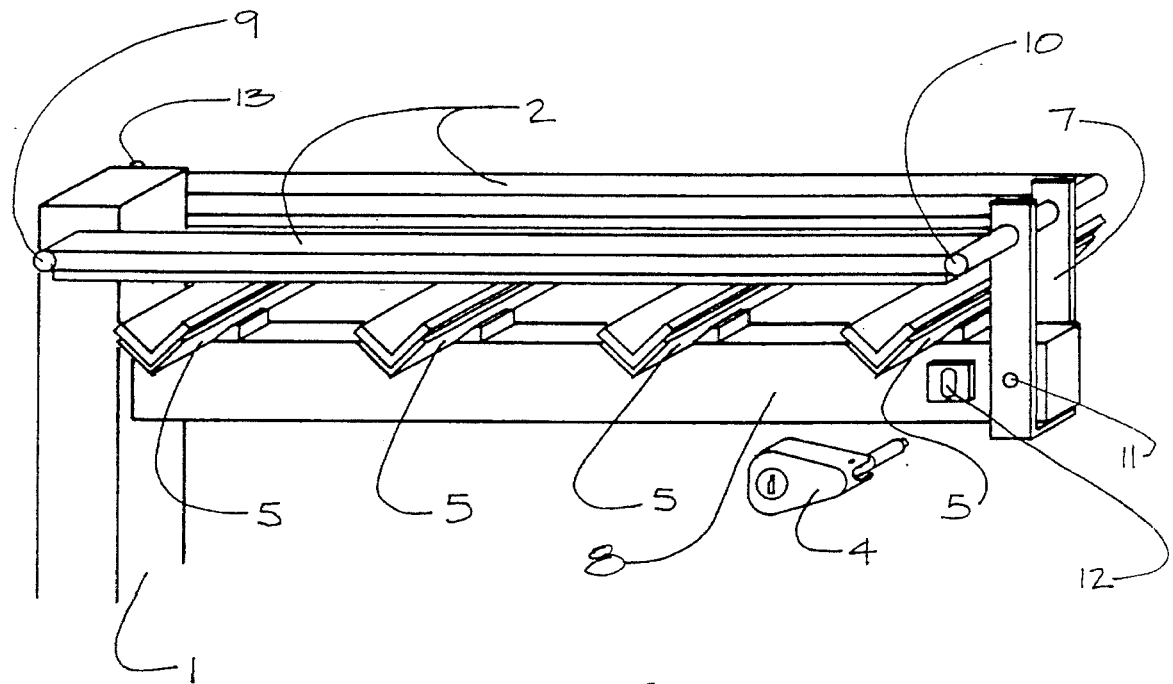
FIG. 3 shows the detail of the locking mechanism and the bicycle holding structures with rubber pads.
Figure 4:
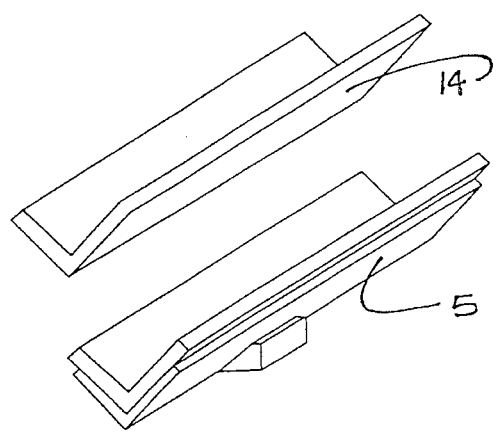
FIG. 4 shows the detail of the bicycle holding bracket

The bicycle rack consists of twelve gauge two inch by two inch tubular steel frame (#1) and sixteen gauge one inch by one half inch crossbars (#2) as described in FIG. 2. The hitch attachment end contains a three quarters inch hole (#3) approximately two and one half inches from the end of the rack. A hitch pin (#6) is used to secure the rack into the receiver hitch. As seen in FIG. 3, the securing arm (#2) has a hinged arm to secure over the bicycle holder (Arm 8). Four to six bicycle holding brackets can be welded to Arm 8. Rubber holders and shims one quarter inch by six inches attached to metal holders are used to secure different sizes of tubular bicycle frames. In addition, the underside of both bars of Arm 2 are covered with one quarter inch rubber to protect and secure the tubular frames of the bicycles.

As seen in FIG. 3, hinges are placed at #9 and #10 to allow for easy movement of Arm 2. Arm 7 is used to secure Arm 2 to Arm 8. A pivoting key locking screw device (#4) with a threaded shaft is screwed into place in hole 11 and the lock end with a locking shaft is placed in hole 12 and key locked into place.

The entire rack is finished with a high gloss rust proof electrostatic paint coating.

The key features of this multi-bicycle rack is the lateral stability, the locking device, adjustment to different tubular bicycle frames, lightweight design and ease in placement in receiver hitch.

OPERATION OF INVENTION

The ease of operation of this bicycle rack is a real advantage. The rack is easily placed in the receiver hitch attached to the rear of a vehicle. A pin secures the rack into the receiver hitch. As seen in FIG. 3, Arm 2 is moved 50 degrees and is leaning to the rear resting on the arm stop (#13) while the bicycles are placed on the holders (#5). Up to six bicycle holders can be welded onto Arm 8. Once the bicycles are placed on the holders, Arm 2 is brought down over the bicycle tubular frames and Arm 7 is placed over the end of Arm 8. If the bicycles are not held tightly, addition rubber shims (#14) can be installed on the holders as needed. The locking device is screwed into hole 11 and moved into place with the locking shaft placed into hole 12 and key locked.

CONCLUSION, RAMIFICATIONS, AND SCOPE OF INVENTION

The multi-bicycle rear mounting rack provides for a lightweight and easy handling bicycle carrier. The stability and security of the rack are clear advantages with the capability of holding up to six bicycles of different tubular frame sizes. Because of the simplicity and ease of operation, any person can place the rack on the vehicle and lock the bicycles in place.

While a presently preferred version of the invention has been described and illustrated for the purposes of clarity and example changes and substitutions will become apparent to those possessing ordinary skill in the art without thereby departing from the scope and spirit of the invention which is defined by the following claims.

What is claimed:

1. A bicycle carrier frame comprising:
   a. a carrier frame adapted to hold multiple bicycles including means for attaching said frame to an automobile;
   b. said frame including a vertical support member and a horizontal support member cantilevered from said vertical support member, a plurality of carrying brackets spaced on horizontal support member each adapted to receive a bicycle tubular frame member;
   c. each bracket including a means for adjusting the size thereof relative to a diameter of the bicycle tubular frame member to be held;
   d. a locking arm having a pair of parallel side elements, a first of said end elements pivotally mounted to said vertical support frame member whereby said locking arm rotates to overlie said carrying brackets for clamping said bicycle tubular frame members to said brackets, and said opposite end element having means for securing said locking arm to said horizontal support frame member.

2. The carrier frame of claim 1 wherein said frame is made of steel and said vertical and horizontal support members are fabricated to extend to lengths necessary for multiple bicycles.

3. The carrier frame of claim 1 wherein the locking arm is formed by tubular members attached to said vertical support member by means of a hinge pin above the horizontal support members and prevents horizontal and lateral movement of the bicycles when clamped therein.

4. The carrier frame of claim 1 wherein the horizontal support member and locking arm together with a portion of the vertical support member and means for securing defined by a locking bracket act as a single structural element when secured.

5. The carrier frame in claim 1 wherein the carrying brackets are adjustable by adding and removing rubber shims thereby changing the separation between the horizontal support member and locking arm to accommodate differences in the bicycle tubular frame widths.

6. The carrier frame in claim 4 wherein the locking bracket when fitted with a lock creates a secure structure which can only be opened with a key.

* * * * *